US006572154B1

(12) United States Patent
Niemiec

(10) Patent No.: US 6,572,154 B1
(45) Date of Patent: Jun. 3, 2003

(54) THREADLESS FLARED TUBE FITTING FOR CONNECTING FLOW CONDUCTORS

(75) Inventor: Albin J. Niemiec, 79700 Hipp Rd., Romeo, MI (US) 48065

(73) Assignee: Albin J. Niemiec, Romeo, MI (US)

( * ) Notice: Subject to any disclaimer, the term of this patent is extended or adjusted under 35 U.S.C. 154(b) by 0 days.

(21) Appl. No.: 10/041,407

(22) Filed: Jan. 8, 2002

(51) Int. Cl.⁷ ................................................ F16L 37/00
(52) U.S. Cl. ...................... 285/305; 285/101; 285/334.5
(58) Field of Search ....................... 285/101, 334.1, 285/334.5, 375, 305, 354

(56) References Cited

U.S. PATENT DOCUMENTS

| 2,113,211 A | * | 4/1938 | Lake | 285/334.5 |
|---|---|---|---|---|
| 2,390,103 A | * | 12/1945 | Johnson | 285/334.5 |
| 2,420,778 A | * | 5/1947 | Herold | 285/334.3 |
| 2,700,559 A | * | 1/1955 | Jensen | 285/334.5 |
| 3,411,812 A | * | 11/1968 | Prince et al. | 285/334.5 |
| 3,628,815 A | * | 12/1971 | King | 285/334.5 |
| 5,492,374 A | * | 2/1996 | Sauer et al. | 285/305 |
| 5,735,553 A | * | 4/1998 | Niemiec | 285/101 |
| 6,412,826 B1 | * | 7/2002 | Kulevsky et al. | 285/305 |

* cited by examiner

Primary Examiner—Lynne H. Browne
Assistant Examiner—James M. Hewitt

(57) ABSTRACT

A threadless flared fitting for mechanically connecting fluid transmission lines includes a diametrically guided sealed piston to engage the flared tube connection. This piston is axially spring loaded and designed to apply a hydrostatic force on the engaged flared connection. Axial clamping preload is provided by a compressed mechanical spring and the hydrostatic pressure force on the sealed piston will reinforce the clamping force in the flared connection and prevent separation.

14 Claims, 5 Drawing Sheets

THREADLESS FLARED TUBE FITTING FOR CONNECTING FLOW CONDUCTORS

DISCLOSURE DOCUMENT

This application contains subject matter which is set forth in the U.S. Patent Disclosure Document Number 499878, dated Sep. 13, 2001.

FIELD OF INTENTION

The invention relates to power transmission flow conductor fittings and particularly to flared tubing connections without the use of threaded connections. The sealing integrity of the line connection is a major consideration.

BACKGROUND OF INVENTION

Most tube and hose connections feature engagement for fastening flared transmission lines and depend upon the mechanical clamping force applied to frusto-conical engaged surfaces of the fitting for sealing.

Most of the current threadless transmissions line connections feature elastomeric sealing elements which depend upon compression to initiate and maintain the fluid seals. The frusto-conical shaped engagement joint common to the flared fittings is not utilized.

These threadless connectors are usually limited to relatively low pressure (less than about 500 psi) fluid transmission applications because of their limited sealing integrity. Such threadless connectors are typically utilized in some automotive fluid systems and in some domestic plumbing installations.

There are many advantages of a threadless tube fittings for connecting fluid transmission lines:

A. Reduced manufacturing and installation costs
B. Simplified installation
C. Applicable in inaccessible installation (limited space for using a wrench)
D. Elimination of possible leakage source, damaged threads, and
E. Rapid installation and disassembly.

SUMMARY OF INVENTION

The present invention provides an internal mechanism in the engaged flared connection of a transmission line to maintain a sealed joint without a torqued-threaded fastener.

The internal mechanism comprises a hollowed piston featuring a frusto-conical shaped surface for engaging and sealing the flared end of a transmission line. Said piston contains a radial sealing means to seal its radial clearance with the bore and to isolate the end which is axially spring biased and exposed to the pressure of the transmitted fluid. The resulting hydrostatic pressure axial force on the piston supplements the compressed mechanical spring force applied at the assembly of the fitting connection. The combination of the mechanical spring force and the hydrostatic pressure force assures sealing contact of the engaged frusto-conical shaped surface with the flared end of the tubing.

The applied hydrostatic force is proportional to the pressure of the transmitted flow in the transmission line.

A mechanical spring is internally compressed between the hollowed piston and a shoulder within the bored body to prevent the piston frusto-conical shaped end from losing seal contact with the flared end of the tubing during low pressure flows.

At assembly of the line connection an axial force is applied against the flared tubing to displace the hollowed piston and to compress the spring means so as to insert a retention ring into the circular groove located in the bore. Part of the retention ring axially supports the enlarged flared end of the tubing to prevent it from being disengaged by the force of the compressed spring means and by the hydrostatic pressure force.

The engaged frusto-conical shaped end of the piston and the flared end of the tubing are preloaded by the compressed spring at assembly of the fitting. As the pressure of the transmitted flow increases, the resulting hydrostatic pressure force increases on the joint to ensure contact and prevent separation.

Unlike the prior art of the threadless fitting connectors relying exclusively on an "O" ring to simultaneously seal two (2) annular clearances to prevent external leakage, the threadless flared fitting connector hereof provides a more dependable "O" ring seal of one annular clearance and a surface-to-surface sealing frusto-conical contact which is axially spring preloaded at assembly and axially loaded further by a hydrostatic force correlated to the pressure of the transmitted fluid.

Because of the superior sealing feature in the present invention fitting connector it is anticipated that its fluid pressure capability should be at least 50 percent greater than the current state-of-the-art threadless fitting connectors.

DETAILED DESCRIPTION OF THE PREFERRED EMBODIMENT

Figure 1:
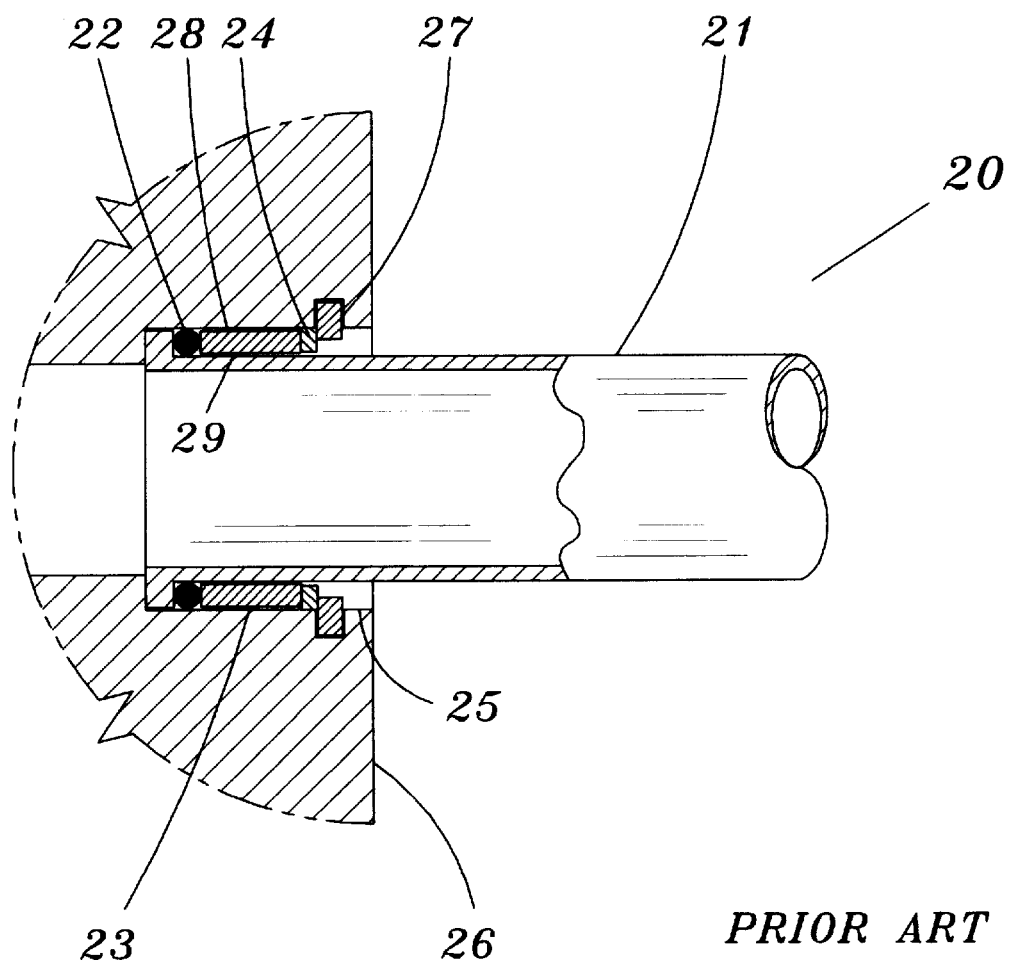
FIG. 1 is a sectional view of a threadless tube fitting connection which is typical of the prior art.

FIG. 1 illustrates a prior art threadless tube fitting connection 20 comprised of a tubing 21 which is crimped at one end to shoulder an "O" ring 22 which is axially contained by a spacer 23 and a washer 24. The listed components are located as a subassembly for installation in a bore 25 which is located in a receiving body 26. The subassembly is retained in the bore 25 by an expansion ring 27. The sealing is dependent upon the hydrostatic pressure to radially and axially deform the "O" ring 22 and seal the two (2) radial clearances 28 and 29 of the rim dimensions of the spacer 23.

Figures 2, 3:
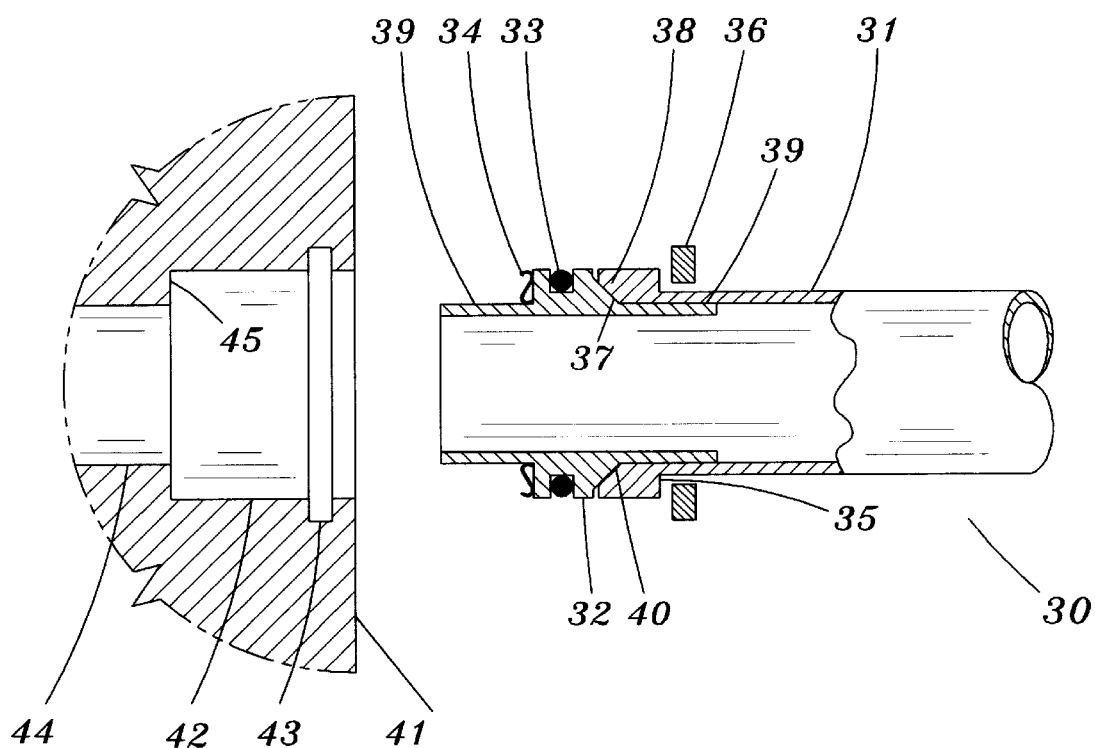
FIG. 2 is a sectional view of the subassembly consisting of the fitting components prior to its installation in the receiving body, this view displays a first preferred embodiment of the invention.
FIG. 3 is a sectional view of the receiving body in which the subassembly described in FIG. 2 is installed to complete the fitting connection. The receiving body is part of the first preferred embodiment of the invention.

FIG. 2 displays a preferred embodiment of the invention in a threadless flared tube fitting connection subassembly 30 comprising the flared tubing 31, a hollowed piston 32, an annular seal 33, and a mechanical spring means 34. The flared end 38 of the tubing provides a shoulder 35 to support the retention of an expansion ring 36. The hollowed piston 32 features a frusto-conical shaped end 37 for receiving the flared end 38 of tubing 31 and for forming a joint 40. The annular seal 33 is located axially and radially in recess on piston 32. Piston 32 possess pilot diameters 39 for guidance and radial support respectively in the tubing 31 and in the receiving body 41 which is shown in FIG. 3.

The displayed subassembly 30 is installed in the receiving body 41 which is shown in FIG. 3

FIG. 3 displays the bore 42 in body 41 receiving the subassembly 30 which is shown in FIG. 2. The length of the bore determines the amount of assembled compression on the spring means 34 and the amount of preload that can be applied on joint 40. A groove 43 is located near the entrance of bore 42 that receives the expansion ring 36 to retain the axially preloaded subassembly 30.

The reduced diameter bore 44 directs the transmitted flow to the system. Shoulder 45 supports the compression of the spring means 34.

Figure 4:
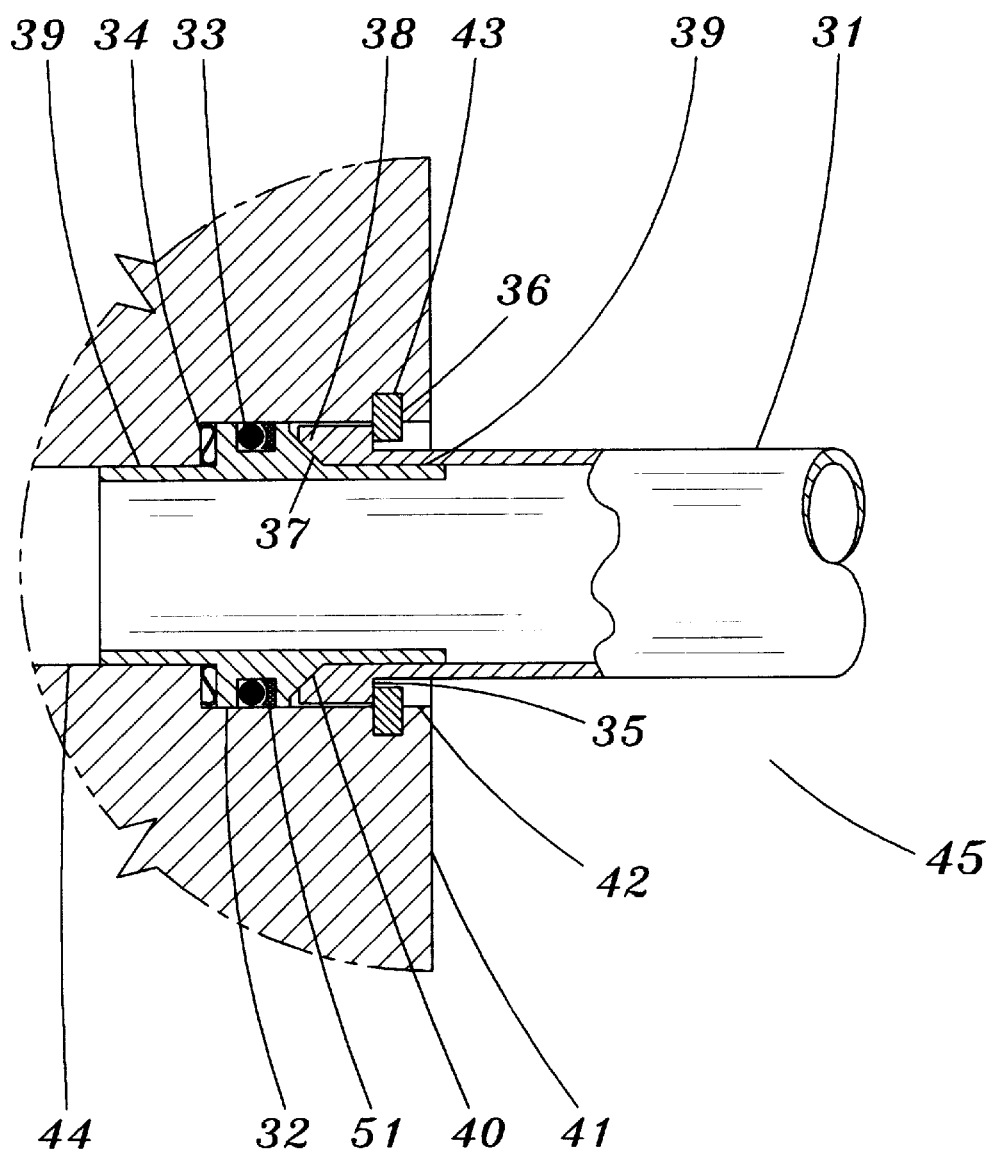
FIG. 4 is a sectional view of the threadless flared tube assembly this view shows the preferred assembly embodiment of the invention.

FIG. 4 displays a preferred embodiment of the invention of the threadless flared tube fitting connection assembly 45. Piston 32 provides the frusto-conical shaped end 37 for engaging the flared end 38 of tubing 31 and forms a joint 40. Pilot diameters 39 of piston 32 align the tubing 31 and bore 42 in body 41. The spring 34 is compressed during installation, the compressive force is supported at the shoulder 35 on the flared tubing and retained by the expansion ring 36 located in groove 43.

A back-up sealing ring 51 is assembled as part of the sealing means 33 to resist extrusion by high pressure of the transmitted flow.

Figure 5:
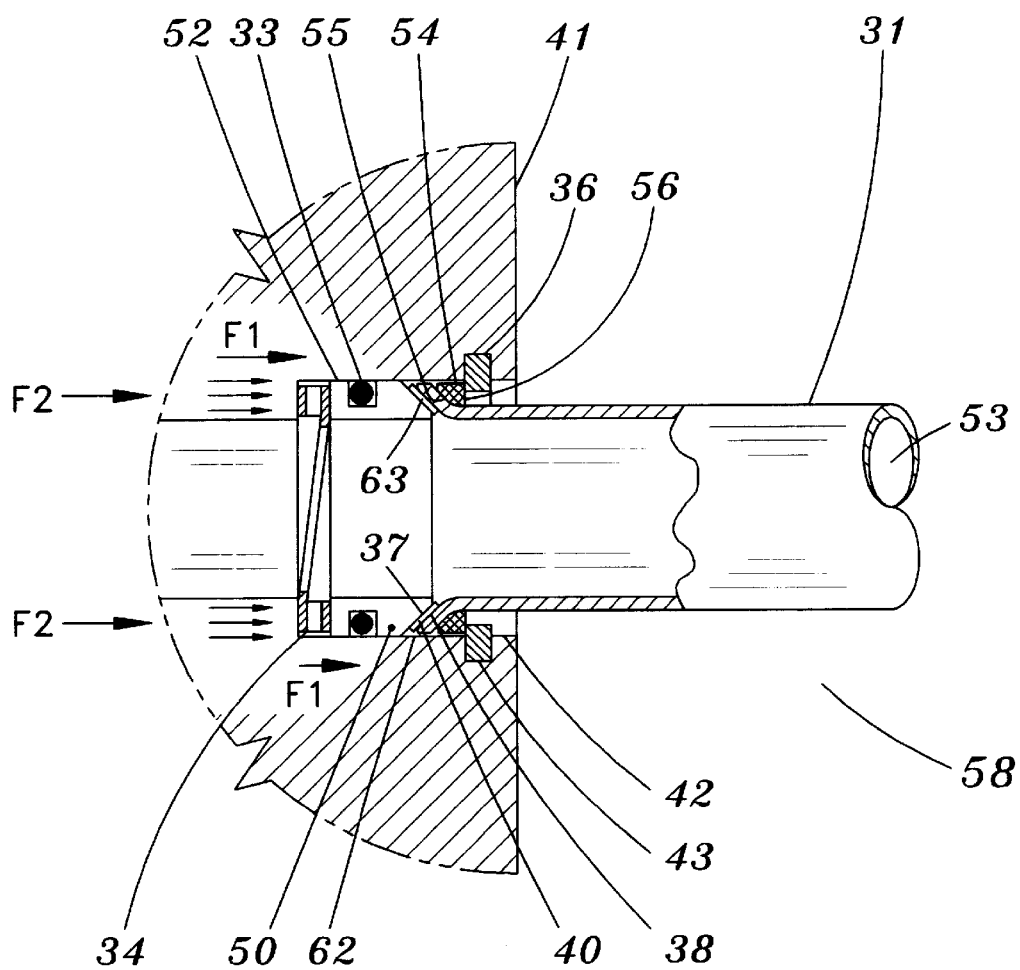
FIG. 5 is a sectional view of a modified version for the threadless flared tube fitting connection with the preferred embodiment of FIG. 3. Included is the illustration of the hydrostatic pressure force distribution in the fitting for maintaining the seal contact at the flared tube connection.

FIG. 5 displays another preferred embodiment of the invention and illustrates the principle forces, F1 and F2, that maintain the sealing contact on the flared joint 40 connection. In this assembly 58, piston 32 is replaced by piston 50 which is modified version that contains the embodied features of the invention. Piston 50 provides a close annular interfit between the rim diameter 52 and bore 42. and the centering effect of the frusto-conical shaped end 37 to align the engagement of flared end 38 of tubing 31 to form a joint 40. The compressed spring 34 applies mechanical force F1 on joint 40 at assembly of the fitting connection. The hydrostatic pressure force F2, a product of the net exposed annular area of the rim diameter 52 and of the fluid pressure in flow passage 53, will add to the assembly contact force on joint 40 to prevent separation.

An intervening malleable seat 63 is located on the frusto-conical shaped end 37 and engaged with the flared end 38 of tubing 31 to form joint 40. A spacer 54 with a beveled surface compensates for the flared surface 55 and to effect a flat support surface 56 for the expansion ring 36 in groove 43.

The spring force F1 prevents separation of joint 40 at low pressure of the transmitted flow in passage 53. The annular seal 33 seals the radial clearances between the bore 42 and rim diameter 52. The radial clearance 62, at the flared joint 40is exposed to atmospheric pressure. The resulting hydrostatic force F2, a product of the net exposed annulus area of the rim diameter 52 and the pressure in the flow passage 53, will supplement the assembly mechanical spring force F1 applied to the flared joint 40 to prevent separation.

The hydrostatic force F2 is proportionally affected by the pressure in flow passage 53.

Figure 6:
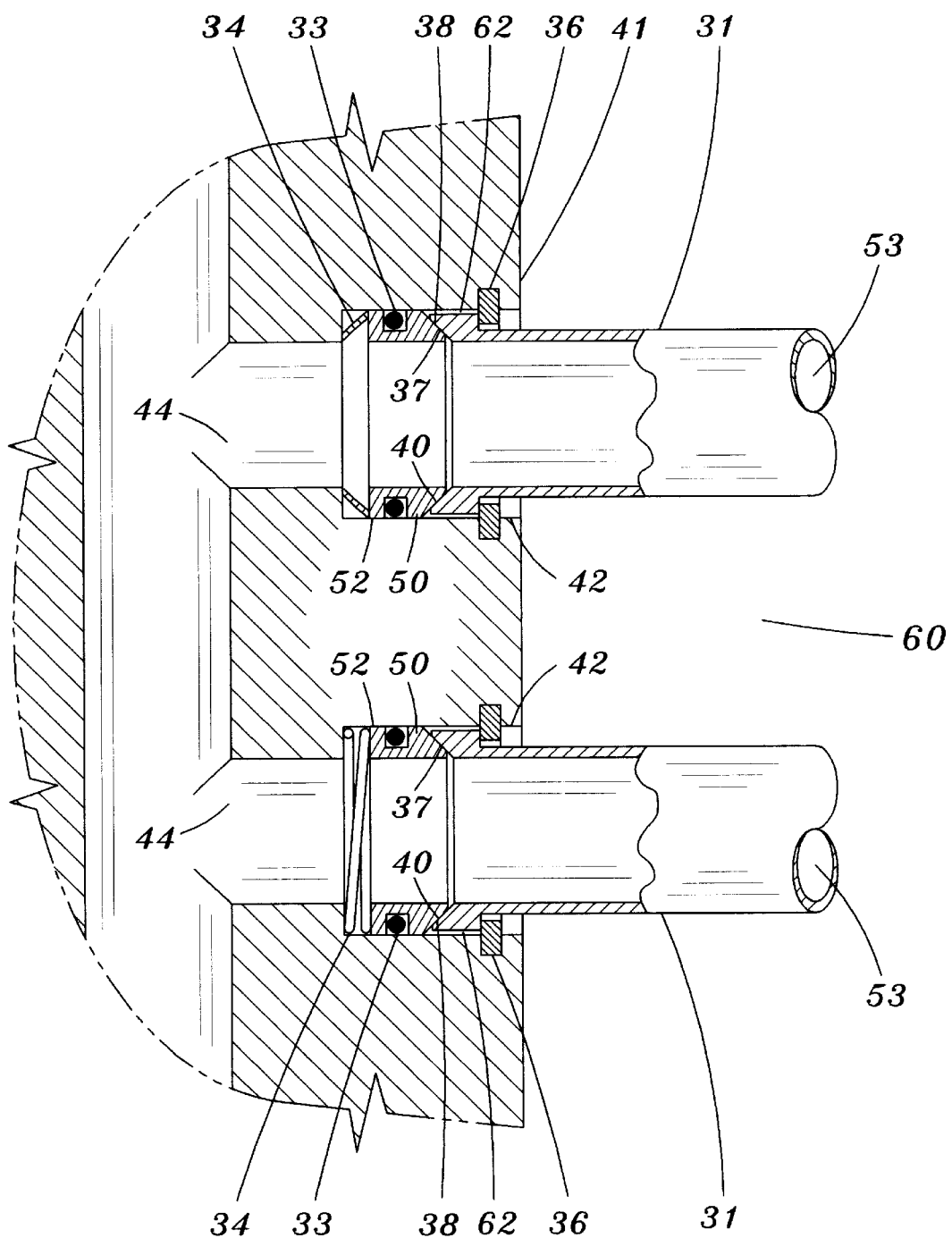
FIG. 6 is a sectional view of multiple threadless flared tube connections of the preferred embodiment of the invention in a single receiving body.

FIG. 6 displays another preferred embodiment, assembly 60, of the invention comprising of more than one threadless flared tubing connections in a common body 41. In each flared joint 40,the flared end 38 engages the frusto-conical shaped end 37. The engagement of the rim diameter 52 of piston 50 in bore 42, and the centering effect of the frusto-conical shaped end 37 on the flared end 38 of tubing 31 aligns the engagement of the flared joint 40. The compressed spring 34 is retained by the installed expansion ring 36.

The seal 33 may comprise a plurality of sealing rings of combined resilient and plastic material. The spring 34 may comprise a wave spring washer, a beveled spring washer or a helical coil spring.

By the above description there is disclosed a novel construction for a threadless flared tube fitting for connecting flow conductors affording a more secured leak-proof assembly compared to the similar purpose connectors of the prior art. The versatility, flexibility, and higher pressure capability afforded thereby should be instantly recognized by those skilled in the art.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A tubing assembly for joining flared transmission tubing adapted to conduct pressurized fluid flow comprising:

a body defining a pair of coaxial contiguous bores with a first bore of said pair being of smaller diameter than the second bore of said pair and together forming a radial shoulder therebetween;

a tubular piston located within the second of said bores and forming a narrow clearance between the outside diameter surface of the piston and the internal diameter surface of the second bore thereat; said piston including a sealing surface adapted to cooperate with a flared end of received tubing for effecting a sealing engagement therewith;

an annular seal positioned in said clearance to seal said clearance against fluid flow about said piston;

spring means located and compressed between said shoulder and said piston urging said sealing surface outward into a sealing engagement against the flared end of received tubing, and retention means operative to resist outward displacement of said piston in opposition to the urging force of said spring means, wherein there is included an annular groove defined in the internal surface of said second bore and said retention means comprises a retaining ring secured in said annular groove and adapted to encircle a received tubing end behind a shoulder thereof.

2. A tubing assembly in accordance with claim 1 in which said sealing surface of said piston is of frusto-conical configuration at an intermediate location about said piston.

3. A tubing assembly in accordance with claim 2 including a first extension of said piston extending outward of said second bore and on which is received the internal diameter of tubing to be joined and a second extension extending inward of said first bore for positioning said piston a controlled distance within said body.

4. A tubing assembly in accordance with claim 2, including an annular groove formed about said piston and said annular seal is contained in said groove in engagement with said body.

5. A tubing assembly in accordance with claim 1 in which the annular outside surface of said piston is sized to provide a predetermined annular surface area for a hydrostatic pressure force in said assembly to exert additional axial sealing force on the engaged sealing surfaces of said piston and said flared tubing.

6. A tubing assembly in accordance with claim 1 which said sealing surface of said piston and tubing are of mutually engaged frusto-conical configuration.

7. A tubing assembly in accordance with claim 4 in which said seal for sealing said clearance comprises an elastomeric ring within said annular groove.

8. A tubing assembly in accordance with claim 4 in which said seal comprises a plurality of sealing rings of combined resilient and plastic material.

9. A tubing assembly in accordance with claim 1 in which said spring means is comprised of a wave spring washer.

10. A tubing assembly in accordance with claim 1 in which spring means is comprised of a beveled spring washer.

11. A tubing assembly in accordance with claim 1 in which said spring means is comprised of a helical coil spring.

12. A tubing assembly in accordance with claim 5 in which there is included a shaped spacer surrounding the received end of said flared tubing to engage and conform to the outside shape of the flared end and aid in the support of the said retention ring.

13. A tubing assembly in accordance with claim 2 in which there is included a malleable material seat liner between the engaged sealing surfaces of said frusto-conical piston surface and the flared surface of the received tubing.

14. A tubing assembly in accordance with claim 1 in which said body includes multiple connections for receiving a plurality of individual transmission tubings to be joined.

* * * * *